(12) United States Patent
Jang et al.

(10) Patent No.: US 10,050,276 B2
(45) Date of Patent: Aug. 14, 2018

(54) NEGATIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Woon-Suk Jang, Yongin-si (KR); Yu-Hyun Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 824 days.

(21) Appl. No.: 14/543,585

(22) Filed: Nov. 17, 2014

(65) Prior Publication Data
US 2015/0200397 A1    Jul. 16, 2015

(30) Foreign Application Priority Data

Jan. 15, 2014 (KR) .................. 10-2014-0005260

(51) Int. Cl.
*H01M 4/62* (2006.01)
*H01M 10/052* (2010.01)
*H01M 4/13* (2010.01)

(52) U.S. Cl.
CPC ............. *H01M 4/622* (2013.01); *H01M 4/13* (2013.01); *H01M 10/052* (2013.01)

(58) Field of Classification Search
CPC ....... H01M 4/622; H01M 4/13; H01M 10/052
See application file for complete search history.

(56) References Cited

U.S. PATENT DOCUMENTS

| 8,585,921 | B2 | 11/2013 | Ryu et al. | |
|---|---|---|---|---|
| 2005/0074669 | A1* | 4/2005 | Park | C09J 101/286 429/217 |
| 2005/0079423 | A1* | 4/2005 | Matsubara | H01M 4/134 429/231.95 |
| 2010/0024204 | A1* | 2/2010 | Min | H01M 10/0567 29/623.2 |
| 2010/0062339 | A1* | 3/2010 | Pan | H01M 4/131 429/231.95 |
| 2012/0034505 | A1* | 2/2012 | Zhu | H01M 4/133 429/94 |
| 2012/0237826 | A1 | 9/2012 | Kim et al. | |

FOREIGN PATENT DOCUMENTS

| KR | 10-2003-0026815 A | 4/2003 |
|---|---|---|
| KR | 10-2007-0076151 A | 7/2007 |
| KR | 10-2012-0106041 A | 9/2012 |
| KR | 10-2013-0094738 A | 8/2013 |

OTHER PUBLICATIONS http://www.sigmaaldrich.com/catalog/product/aldrich/419311?lang=en&region= (Year: 2012).*
http://www.sigmaaldrich.com/catalog/product/aldrich/341584?lang=en&region=US (Year: 2013).*

* cited by examiner

*Primary Examiner* — Lisa S Park
(74) *Attorney, Agent, or Firm* — Knobbe Martens Olson & Bear LLP

(57) ABSTRACT

Disclosed is a negative electrode for a rechargeable lithium battery that includes a negative active material and a binder, wherein the binder includes carboxymethyl cellulose, polyvinyl alcohol, and a styrene-butadiene rubber, and a rechargeable lithium battery including the same.

15 Claims, 2 Drawing Sheets

NEGATIVE ELECTRODE FOR RECHARGEABLE LITHIUM BATTERY AND RECHARGEABLE LITHIUM BATTERY INCLUDING SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2014-0005260 filed in the Korean Intellectual Property Office on Jan. 15, 2014, the disclosure of which is incorporated herein by reference in its entirety.

BACKGROUND

Field

This disclosure relates to a negative electrode for a rechargeable lithium battery and a rechargeable lithium battery including the same are disclosed.

Description of the Related Technology

A rechargeable lithium battery has drawn attention as a power source for small, portable electronic devices. Rechargeable lithium batteries include an organic electrolyte solution and have a high discharge voltage that may be two times or more greater than a conventional battery that includes an alkali aqueous solution. Accordingly, lithium batteries have a high energy density.

A lithium-transition metal oxide having a structure being capable of intercalating lithium ions, such as $LiCoO_2$, $LiMn_2O_4$, $LiNi_{1-x}Co_xO_2$ ($0<x<1$), and the like may be used as positive active materials of a rechargeable lithium battery. Various carbon-based materials such as artificial graphite, natural graphite, and hard carbon that may intercalate and deintercalate have been used as negative active materials of a rechargeable lithium battery.

An electrode of a lithium battery may be formed by coating a slurry in which an active material, a binder, and a solvent are mixed and dispersed on a current collector and drying the same. However, the coating layer may have weak adherence to the current collector and thus, cause a crack on an electrode. In order to avoid this problem, the binder may be included in a larger amount but larger amounts of binder may impair impregnation of the electrolyte to the electrode. The impaired impregnation may subsequently deteriorate battery performance such as cycle-life and the like.

SUMMARY

One embodiment provides a negative electrode for a rechargeable lithium battery having improved cycle-life characteristics. In some embodiments, the negative electrode may be a thick-film electrode. In some embodiments, the negative electrode may be a thick-film electrode where the improved cycle-life characteristics of the battery partially result from improving flexibility of the thick-film electrode, thereby, preventing a crack from forming in the negative electrode.

Another embodiment provides a rechargeable lithium battery including the negative electrode for a rechargeable lithium battery.

Some embodiments provide a negative electrode for a rechargeable lithium battery including a negative active material and a binder, wherein the binder includes carboxymethyl cellulose, polyvinyl alcohol, and a styrene-butadiene rubber, the carboxymethyl cellulose includes a repeating unit represented Chemical Formula 1 and a repeating unit represented by Chemical Formula 2. In some embodiments, a sum of a mole number ($n^1$) of a repeating unit represented by Chemical Formula 1 and a mole number ($n^2$) of a repeating unit represented by Chemical Formula 2 is greater than or equal to about 1500, a loading level, a weight per a unit area of a cross-section of the negative electrode is greater than or equal to about 12 mg/cm². Some embodiments disclosed herein utilize a carboxymethyl cellulose including a repeating unit represented by Chemical Formula 1,

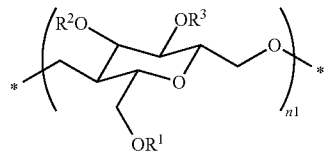

Chemical Formula 1 wherein in Chemical Formula 1, $R^1$ to $R^3$ are independently a hydrogen atom, —OH or —$(CH_2OCH_2)_{p1}$—$COOX^1$, wherein at least one of $R^1$ to $R^3$ is —$(CH_2OCH_2)_{p1}$—$COOX^1$, wherein $p^1$ is an integer ranging from 1 to 5, and $X^1$ is an alkali metal, and $n^1$ is an integer of greater than or equal to 600.

Some embodiments disclosed herein utilize a carboxymethyl cellulose including a repeating unit represented by Chemical Formula 2,

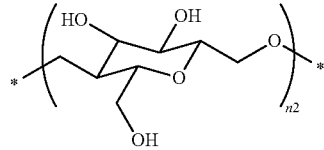

Chemical Formula 2 wherein in Chemical Formula 2, $n^2$ is an integer of 0 to 2000. In some embodiments, $n^2$ is an integer of 1 to 2000.

In some embodiments, the sum of a mole number ($n^1$) of a repeating unit represented by Chemical Formula 1 and a mole number ($n^2$) of a repeating unit represented by Chemical Formula 2 may be an integer of about 1500 to about 3000.

In some embodiments, the loading level of the cross-section of the negative electrode may be about 12 mg/cm² to about 18 mg/cm².

In some embodiments, a substitution degree of the carboxymethyl cellulose may be about 0.5 to about 1.5.

In some embodiments, the carboxymethyl cellulose may be included in an amount of about 0.5 wt % to about 3 wt % based on the total amount of the negative active material and the binder.

In some embodiments, the polyvinyl alcohol may include a repeating unit represented by Chemical Formula 3,

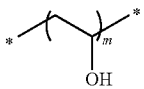

Chemical Formula 3 wherein in Chemical Formula 3, m is an integer of greater than or equal to about 1500. In some embodiments, m is an integer of greater than or equal to 1500.

In some embodiments of Chemical Formula 3, m may be an integer of 1500 to 3000.

In some embodiments, the polyvinyl alcohol may be included in an amount of greater than about 0 and less than or equal to about 0.5 wt % based on the total amount of the negative active material and the binder.

In some embodiments, a glass transition temperature of the styrene-butadiene rubber may be greater than about $-50°$ C. and less than 20° C.

In some embodiments, the styrene-butadiene rubber may be included in an amount of about 0.5 wt % to about 2 wt % based on the total amount of the negative active material and the binder.

In some embodiments, the negative active material and the binder may be included in a weight ratio of about 95:5 to about 99:1.

In some embodiments, a filling density, a weight ratio per a unit volume of the negative electrode may be greater than or equal to about 1.60 g/cc.

Another embodiment provides a rechargeable lithium battery including the negative electrode; a positive electrode; and an electrolyte solution.

Other embodiments are included in the following detailed description.

In some embodiments, a rechargeable lithium battery having improved cycle-life characteristics may be realized by improving flexibility of a thick-film electrode to prevent a crack and also, improving adherence and impregnation.

DETAILED DESCRIPTION

Hereinafter, embodiments of the present disclosure are described in detail. However, these embodiments are exemplary, and this disclosure is not limited thereto.

Figure 1:
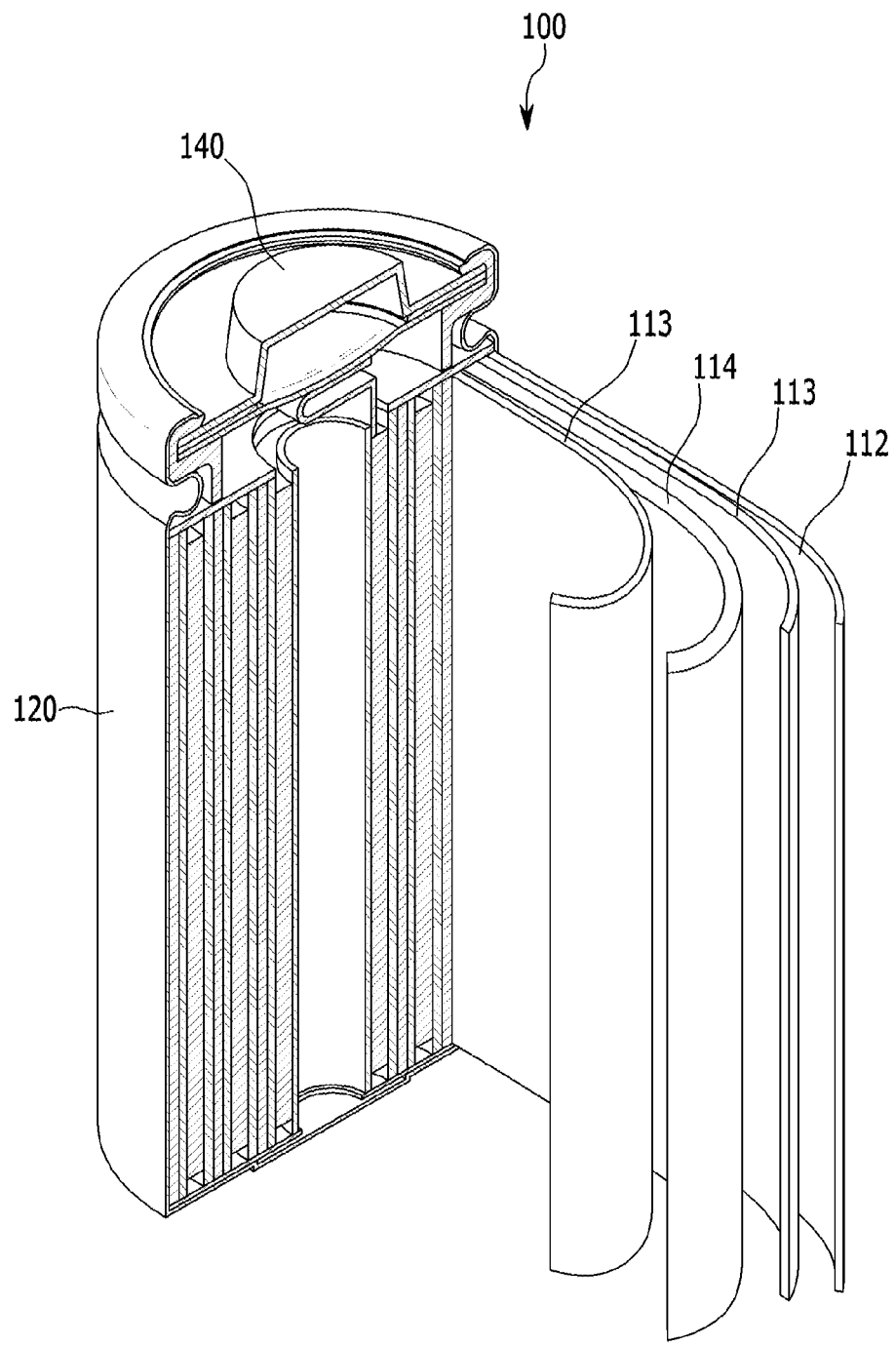
FIG. 1 is a schematic view showing a rechargeable lithium battery according to one embodiment.

A rechargeable lithium battery according to one embodiment is described referring to FIG. 1.

FIG. 1 is a schematic view of a rechargeable lithium battery according to one embodiment.

Referring to FIG. 1, a rechargeable lithium battery 100 according to one embodiment includes a positive electrode 114, a negative electrode 112 facing the positive electrode 114, a separator 113 interposed between the negative electrode 112 and the positive electrode 114, an electrolyte (not shown) impregnating the separator 113, a battery case 120, and a sealing member 140 sealing the battery case 120.

In some embodiments, the negative electrode includes a current collector and a negative active material layer disposed on the current collector.

According to one embodiment, the negative active material layer may be formed to have a loading level of greater than or equal to about 12 mg/cm$^2$ on one side of the current collector, and herein, the loading level indicates a weight ratio per unit area. In some embodiments, the negative electrode may be a thick-film electrode having a loading level of greater than or equal to about 12 mg/cm$^2$ on the cross-section and specifically, a loading level of about 12 mg/cm$^2$ to about 18 mg/cm$^2$. In some embodiments, the thick-film electrode may increase capacity of a rechargeable lithium battery.

In some embodiments, the negative active material layer may include a negative active material and a binder.

In some embodiments, the binder may include carboxymethyl cellulose, polyvinyl alcohol, and a styrene-butadiene rubber. According to one embodiment, the binder obtained by mixing these materials may improve flexibility, adherence, and impregnation of a negative electrode, even though the negative electrode is thick.

In some embodiments, the carboxymethyl cellulose may have a structure including a repeating unit represented by Chemical Formula 1,

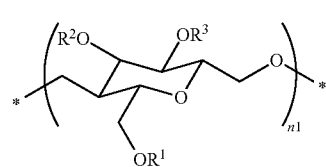

Chemical Formula 1 wherein in Chemical Formula 1,
$R^1$ to $R^3$ are each independently a hydrogen atom, —OH or —(CH$_2$OCH$_2$)$_{p1}$—COOX$^1$, wherein at least one of $R^1$ to $R^3$ is —(CH$_2$OCH$_2$)$_{p1}$—COOX$^1$, wherein $p^1$ is an integer ranging from 1 to 5, and $X^1$ is an alkali metal, and
$n^1$ is an integer of greater than or equal to 600.

In some embodiments of Chemical Formula 1, $X^1$ may be an alkali metal such as Na, Ca, and the like.

In some embodiments, the carboxymethyl cellulose may have a structure including a repeating unit represented by Chemical Formula 2,

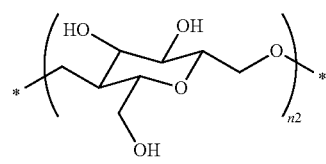

Chemical Formula 2 wherein in Chemical Formula 2,
$n^2$ is an integer of 0 to 2000. In some embodiments, $n^2$ is an integer of 1 to 2000.

In some embodiments, the carboxymethyl cellulose may have a structure including a repeating unit represented by Chemical Formula 1 and Chemical Formula 1. In some embodiments, the $n^1$ of Chemical Formula 1, and $n^2$ of Chemical Formula 2 may represent a mole number of each repeating unit in the structure of carboxymethyl cellulose. In some embodiments, the repeating units represented by Chemical Formulas 1 and 2 may be consecutively arranged but are not limited thereto, and may be variously arranged as a homo, a random, a block, and the like. In some embodiments, the repeating units represented by Chemical Formulas 1 and 2 may be consecutively and alternatively arranged where each repeating unit represented by Chemical Formula 1 alternates with each repeating unit represented by Chemical Formula 2.

In some embodiments, polymerization degree of the carboxymethyl cellulose represents a sum of a mole number ($n^1$) of a repeating unit represented by Chemical Formula 1 and a mole number ($n^2$) of a repeating unit represented by Chemical Formula 2, and may be greater than or equal to about 1500. When the polymerization degree of the carboxymethyl cellulose is greater than or equal to about 1500, even a thick-film electrode has excellent flexibility and may be prevented from a crack and thus, secure excellent cycle-life characteristics of a rechargeable lithium battery. In some embodiments, a polymerization degree of the carboxymethyl cellulose may be an integer of 1500 to 3000, and more specifically 1500 to 2000.

In some embodiments, a substitution degree of the carboxymethyl cellulose may be about 0.5 to about 1.5. In some embodiments, the substitution degree indicates a degree that a carboxylate group is substituted for a hydroxy group in the molecule structure of the carboxymethyl cellulose. Specifically, when one of three hydroxy groups presented in one repeating unit is substituted with a carboxylate group, the substitution degree of the repeating unit is 1, when all three hydroxy groups are substituted with carboxylate groups, the substitution degree is 3, but when all three hydroxy groups are not substituted, the substitution degree is 0.

In some embodiments, the repeating unit represented by Chemical Formula 1 has a substitution degree of 1 to 3, since at least one of three hydroxy groups is substituted with a carboxylate group, and the repeating unit represented by Chemical Formula 2 has a substitution degree of 0. Accordingly, since the substitution degree of carboxymethyl cellulose according to one embodiment is obtained by averaging substitution degrees of each repeating unit, the carboxymethyl cellulose including the repeating unit represented by Chemical Formula 1 and selectively the repeating unit represented by the above Chemical Formula 2 may have a substitution degree of 0.5 to 1.5 and specifically, 0.5 to 1.0. When the carboxymethyl cellulose has a substitution degree within the range, flexibility of the thick-film electrode may be further improved.

In some embodiments, the carboxymethyl cellulose may be included in an amount of about 0.5 wt % to about 3 wt % and specifically about 0.5 wt % to about 1 wt %, based on the total amount of the negative active material layer, that is to say, based on the total amount of the negative active material and the binder. When the carboxymethyl cellulose is included within the range, excellent cycle-life characteristics may be secured by further improving flexibility of the thick-film electrode and thus, crack characteristics of the electrode.

In some embodiments, the polyvinyl alcohol may have a structure including a repeating unit represented by Chemical Formula 3,

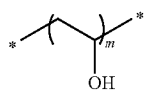

Chemical Formula 3 wherein in Chemical Formula 3, m is an integer of greater than or equal to about 1500.

In some embodiments, the polyvinyl alcohol may be additionally used to improve adherence of the negative active material layer to the current collector.

In some embodiments of Chemical Formula 3, m represents the number of the repeating unit, and represents a polymerization degree of the polyvinyl alcohol. In some embodiments, the polyvinyl alcohol having a polymerization degree of greater than or equal to about 1500 may improve flexibility of the thick-film electrode and prevent the electrode from being cracked and thus, secure excellent cycle-life characteristics of a rechargeable lithium battery. In some embodiments of Chemical Formula 3, m may be an integer of 1500 to 3000. In some embodiments of Chemical Formula 3, m may be an integer of 1500 to about 2000.

In some embodiments, the polyvinyl alcohol may be included in an amount of greater than about 0 and less than or equal to about 0.5 wt %, and specifically about 0.05 wt % to about 0.3 wt % based on the total amount of the negative active material layer, that is to say, based on the total amount of the negative active material and the binder. When the polyvinyl alcohol is included within the range, the negative active material layer has excellent adherence to a current collector and further improve flexibility of the thick-film electrode and thus, may secure crack characteristics of the electrode and excellent cycle-life characteristics of a rechargeable lithium battery.

In some embodiments, the styrene-butadiene rubber may be used as a binder. In some embodiments, a glass transition temperature of the styrene-butadiene rubber may be greater than about −50° C. and less than 20° C., and specifically about −20° C. to about 10° C. When the styrene-butadiene rubber has a glass transition temperature within the range, the thick-film electrode may have improved flexibility and be prevented from a crack, securing excellent cycle-life characteristics of a rechargeable lithium battery.

In some embodiments, the styrene-butadiene rubber may be included in an amount of about 0.5 wt % to 2 wt %, specifically about 1 wt % to about 2 wt %, and more specifically about 1 wt % to about 1.5 wt % based on the total amount of the negative active material layer, that is to say, based on the total amount of the negative active material and the binder. When the styrene-butadiene rubber is included within the range, a rechargeable lithium battery having excellent cycle-life characteristics and high-rate charge and discharge characteristics is realized by improving electrical conductivity as well as further improving flexibility of the thick-film electrode and preventing the electrode from a crack.

When the carboxymethyl cellulose, the polyvinyl alcohol, and the styrene-butadiene rubber are mixed to prepare a binder for manufacturing a negative electrode, a rechargeable lithium battery having excellent cycle-life characteristics may be realized by improving flexibility of the thick-film electrode and preventing the electrode from a crack as well as simultaneously improving adherence and impregnation of the electrode.

In some embodiments, the negative active material and the binder may be included in a weight ratio of about 95:5 to about 99:1, and specifically about 97:3 to about 99:1. When the negative active material and the binder are mixed within the weight ratio range, a negative electrode having excellent flexibility, adherence and impregnation may be formed.

In some embodiments, the negative active material may include a material that reversibly intercalates/deintercalates lithium ions, lithium metal, lithium metal alloy, material being capable of doping and dedoping lithium, or transition metal oxide.

In some embodiments, the material that reversibly intercalates/deintercalates lithium ions may be a carbon material which is any generally-used carbon-based negative active material rechargeable lithium battery, and examples thereof may be crystalline carbon, amorphous carbon, or a mixture thereof. Examples of the crystalline carbon may be graphite such as amorphous, sheet-shape, flake, spherical shape or fiber-shaped natural graphite or artificial graphite, and examples of the amorphous carbon may be soft carbon or hard carbon, a mesophase pitch carbonized product, fired coke, and the like.

In some embodiments, the lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

In some embodiments, the material being capable of doping and dedoping lithium may be Si, $SiO_x$, ($0<x<2$), a Si—C composite, a Si-Q alloy (wherein Q is an alkali metal, an alkaline-earth metal, Group 13 to 16 elements, a transition metal, a rare earth element or a combination thereof, and not Si), Sn, $SnO_2$, a Sn—C composite, Sn—R (wherein R is an alkali metal, an alkaline-earth metal, Group 13 to 16 elements, transition metal, a rare earth element, or a combination thereof, and not Sn), and the like, and at least one of these may be mixed with $SiO_2$. Specific examples of the Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

In some embodiments, the transition metal oxide may be vanadium oxide, lithium vanadium oxide, and the like.

In some embodiments, the negative active material layer may further include a conductive material.

The conductive material improves conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as a polyphenylene derivative and the like; or a mixture thereof.

In some embodiments, the negative active material layer may be formed on the current collector, and the current collector may be a copper foil.

In some embodiments, the negative electrode may be manufactured by mixing the negative active material, the binder, and optionally the conductive material in a solvent to prepare a negative active material composition, and applying the negative active material composition on the negative current collector. Herein, the solvent includes water and the like, but is not limited thereto.

According to one embodiment, the negative electrode may have a filling density, that is, a weight ratio per a unit volume of greater than or equal to about 1.60 g/cc and specifically, about 1.65 g/cc to about 1.80 g/cc. A high density negative electrode having a filling density within the range may secure excellent flexibility, adherence, and impregnation.

In some embodiments, the positive electrode includes a current collector and a positive active material layer disposed on the current collector.

In some embodiments, the current collector may use aluminum, but is not limited thereto.

In some embodiments, the positive active material layer includes a positive active material.

In some embodiments, the positive active material may use a compound (lithiated intercalation compound) being capable of intercalating and deintercallating lithium, and specifically lithium metal oxide.

In some embodiments, the lithium metal oxide may specifically be an oxide of at least one metal selected from cobalt, manganese, nickel, and aluminum, and lithium. In some embodiments, the positive active material may use a compound represented by one of the following chemical formulae:

$Li_aA_{1-b}X_bD^1_2$ ($0.90 \le a \le 1.8$, $0 \le b \le 0.5$); $Li_aA_{1-b}X_bO_{2-c}D^1_c$ ($0.90 \le a \le 1.8$, $0 \le b \le 0.5$, $0 \le c \le 0.05$); $Li_aE_{1-b}X_bO_{2-c}D^1_c$ ($0.90 \le a \le 1.8$, $0 \le b \le 0.5$, $0 \le c \le 0.05$); $Li_aE_{2-b}X_bO_{4-c}D^1_c$ ($0.90 \le a \le 1.8$, $0 \le b \le 0.5$, $0 \le c \le 0.05$); $Li_aNi_{1-b-c}Co_bX_cD^1_\alpha$ ($0.90 \le a \le 1.8$, $0 \le b \le 0.5$, $0 \le c \le 0.05$, $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD^1_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $LiQS_2$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In chemical formulae, A is selected from Ni, Co, Mn, and a combination thereof; X is selected from Al, Ni, Co, Mn, Cr, Fe, Mg, Sr, V, a rare earth element, and a combination thereof; $D^1$ is selected from O (oxygen), F (fluorine), S (sulfur), P (phosphorus), and a combination thereof; E is selected from Co, Mn, and a combination thereof; T is selected from F (fluorine), S (sulfur), P (phosphorus), and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; J is selected from V, Cr, Mn, Co, Ni, Cu, and a combination thereof.

In some embodiments, the positive active material layer may further include a binder and a conductive material.

The binder improves binding properties of positive active material particles with one another and with a current collector. Examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. Examples thereof may be a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like; or a mixture thereof.

The electrolyte solution includes a non-aqueous organic solvent and a lithium salt.

The non-aqueous organic solvent serves as a medium for transmitting ions taking part in the electrochemical reaction of a battery. The non-aqueous organic solvent may be selected from a carbonate-based, ester-based, ether-based, ketone-based, alcohol-based, or aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

Particularly, when the linear carbonate compounds and cyclic carbonate compounds are mixed, an organic solvent having a high dielectric constant and a low viscosity may be provided. The cyclic carbonate and the linear carbonate are mixed together in a volume ratio ranging from about 1:1 to 1:9.

In addition, the ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, and the like. The ether solvent may be, for example dibutylether, tetraglyme, diglyme, dimethoxyethane, 2-methyltetrahydrofuran, tetrahydrofuran, and the like, and the ketone-based solvent may be cyclohexanone, and the like. In addition, the alcohol-based solvent may be ethanol, isopropyl alcohol, and the like.

The non-aqueous organic solvent may be used singularly or in a mixture, and when the organic solvent is used in a mixture, the mixture ratio may be controlled in accordance with a desirable battery performance.

In some embodiments, the non-aqueous electrolyte may further include an overcharge inhibitor additive such as ethylene carbonate, pyrocarbonate, or the like.

The lithium salt is dissolved in an organic solvent, supplies lithium ions in a battery, basically operates the rechargeable lithium battery, and improves lithium ion transportation between positive and negative electrodes therein.

Specific examples of the lithium salt may be $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers of 1 to 20, respectively), LiCl, LiI, $LiB(C_2O_4)_2$ (lithium bis(oxalato)borate), or a combination thereof.

In some embodiments, the lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator may include any materials commonly used in the conventional lithium battery as long as separating the negative electrode from the positive electrode and providing a transporting passage for lithium ion. In other words, the separator may have a low resistance to ion transportation and an excellent impregnation for an electrolyte. For example, it may be selected from glass fiber, polyester, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Hereinafter, the embodiments are illustrated in more detail with reference to examples. However, these examples are exemplary, and the present disclosure is not limited thereto.

Furthermore, what is not described in this disclosure may be sufficiently understood by those who have knowledge in this field and will not be illustrated here.

EXAMPLES 1 To 4, REFERENCE EXAMPLES 1 And 2, AND COMPARATIVE EXAMPLES 1 To 7

Artificial graphite, carboxymethyl cellulose (CMC) having a polymerization degree and a substitution degree in the following Table 1, a styrene-butadiene rubber (SBR) having a polymerization degree in the following Table 1, and polyvinyl alcohol (PVA) having a glass transition temperature (Tg) in the following Table 1 in a weight ratio provided in the following Table 1 were added to water as a solvent, preparing slurry. The slurry was coated on a copper foil and then, dried and roll-pressed, manufacturing a negative electrode having a loading level and filling density in the following Table 1.

The carboxymethyl cellulose (CMC) had a repeating unit Chemical Formula 1 and a repeating unit represented by Chemical Formula 2.

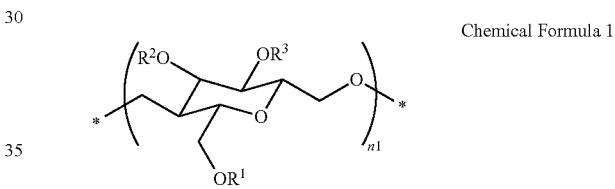

Chemical Formula 1 wherein in Chemical Formula 1,
$R^1$ is OH, $R^2$ is OH, and $R^3$ is —$CH_2OCH_2COONa$, and $n^1$ is shown in the following Table 2.

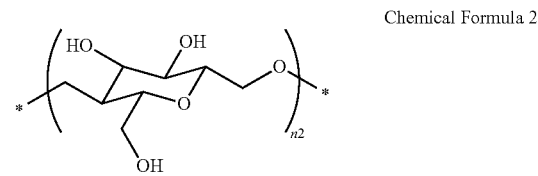

Chemical Formula 2 wherein in Chemical Formula 2, $n^2$ is shown in the following Table 2.

$LiCoO_2$, polyvinylidene fluoride (PVdF), and carbon black in a weight ratio of 97.5:1.25:1.25 were added to an N-methylpyrrolidone (NMP) solvent, preparing slurry. The slurry was coated on an aluminum (Al) thin foil and then, dried and roll-pressed, manufacturing a positive electrode.

An electrolyte solution was prepared by mixing ethylene carbonate, ethylmethyl carbonate, and dimethyl carbonate in a volume ratio of 2:4:4 and adding 1.15 M of $LiPF_6$ to the mixed solvent.

The negative and positive electrodes and the electrolyte solution were used along with a polyethylene separator, manufacturing a rechargeable lithium battery cell.

TABLE 1

| | Loading level (mg/cm$^2$) | Filling density (g/cc) | Weight ratio of graphite: CMC:SBR:PVA | Polymerization degree of CMC | Substitution degree of CMC | Polymerization degree of PVA | Tg (° C.) of SBR |
|---|---|---|---|---|---|---|---|
| Example 1 | 13 | 1.65 | 98:1:0.8:0.2 | 1800 | 0.6 | 1800 | −10 |
| Example 2 | 13 | 1.65 | 98:1:0.8:0.2 | 1500 | 0.7 | 1800 | −10 |
| Example 3 | 13 | 1.65 | 98:1:0.6:0.4 | 1800 | 0.6 | 1800 | −10 |
| Example 4 | 13 | 1.65 | 98:1:0.6:0.4 | 1500 | 0.7 | 1800 | −10 |
| Reference Example 1 | 13 | 1.65 | 98:1:0.8:0.2 | 1800 | 0.6 | 1800 | 20 |
| Reference Example 2 | 13 | 1.65 | 98:1:0.8:0.2 | 1800 | 0.6 | 1300 | −10 |
| Comparative Example 1 | 13 | 1.65 | 98:1:1:0 | 1300 | 0.8 | — | −10 |
| Comparative Example 2 | 13 | 1.65 | 97:1:0:2 | 1300 | 0.8 | 1800 | — |
| Comparative Example 3 | 13 | 1.65 | 98:1:1:0 | 1800 | 0.6 | — | −10 |
| Comparative Example 4 | 13 | 1.65 | 98:1:0.8:0.2 | 1300 | 0.8 | 1800 | −10 |
| Comparative Example 5 | 13 | 1.65 | 98:1:0.6:0.4 | 1300 | 0.8 | 1800 | −10 |
| Comparative Example 6 | 10 | 1.65 | 98:1:0.8:0.2 | 1800 | 0.6 | 1800 | −10 |
| Comparative Example 7 | 10 | 1.65 | 98:1:0.6:0.4 | 1800 | 0.6 | 1800 | −10 |

TABLE 2

| | A mole number (n$^1$) of the repeating unit represented by Chemical Formula 1 | A mole number (n$^2$) of the repeating unit represented by Chemical Formula 2 |
|---|---|---|
| Example 1 | 1080 | 720 |
| Example 2 | 1050 | 450 |
| Example 3 | 1080 | 720 |
| Example 4 | 1050 | 450 |
| Reference Example 1 | 1080 | 720 |
| Reference Example 2 | 1080 | 720 |
| Comparative Example 1 | 1040 | 260 |
| Comparative Example 2 | 1040 | 260 |
| Comparative Example 3 | 1080 | 720 |
| Comparative Example 4 | 1040 | 260 |
| Comparative Example 5 | 1040 | 260 |
| Comparative Example 6 | 1080 | 720 |
| Comparative Example 7 | 1080 | 720 |

Polymerization degree of CMC in Table 1 indicates a sum of n$^1$ of Chemical Formula 1 and n$^2$ of Chemical Formula 2. It is understood that when a value is listed as zero in a ratio in Table 1 that the number is being included to indicate that the corresponding component is not present and should not be interpreted to have a mathematical meaning. For example, the ratio of 98:1:1:0 in Comparative Example 1 and Comparative Example 3 indicates PVA is not present and the weight ratio of graphite:CMC:SBR is 98:1:1. Further, the ratio of 97:1:0:2 in Comparative Example 2 indicates SBR is not present and the weight ratio of graphite:CMC:PVA is 97:1:3.

Substitution degree of CMC in Table 1 is obtained by averaging substitution degree of a repeating unit represented by Chemical Formula 1 and substitution degree of a repeating unit represented by Chemical Formula 2.

Polymerization degree of PVA in Table 1 is the same as m of Chemical Formula 3.

Evaluation 1: Adherence of Negative Electrode

Adherences of the negative electrodes according to Examples 1 to 4, Reference Examples 1 and 2, and Comparative Examples 1 to 5 were evaluated in the following method, and the results are provided in the following Table 2.

Adherence of the negative electrodes was evaluated by attaching a negative active material layer formed on the copper foil to a tape and peeling it off with 180° peeling at a speed of 50 mm/min by using a universal tester.

Evaluation 2: Effect of a Crack in the Negative Electrode

Whether the negative electrodes according to Examples 1 to 4, Reference Examples 1 and 2, and Comparative Examples 1 to 5 were cracked or not were evaluated in the following method, and the results are provided in the following Table 3.

The negative electrodes were folded back and forth respectively once, and whether the negative electrodes were cracked or not and had a pin hole or not was examined. Herein, when the negative electrodes were cracked, they were evaluated as a crack, but when the negative electrodes were not cracked but had a pin hole, they were evaluated as a pin hole.

TABLE 3

| | Adhesion strength (gf/mm) | Crack status |
|---|---|---|
| Example 1 | 1.22 | ○ |
| Example 2 | 1.03 | ○ |
| Example 3 | 1.13 | Δ |
| Example 4 | 1.15 | Δ |
| Reference Example 1 | 1.02 | Δ |
| Reference Example 2 | 0.68 | ○ |
| Comparative Example 1 | 0.65 | X |

TABLE 3-continued

| | Adhesion strength (gf/mm) | Crack status |
|---|---|---|
| Comparative Example 2 | 0.15 | X |
| Comparative Example 4 | 0.73 | X |
| Comparative Example 5 | 0.58 | X |

Crack status Evaluation: ○ no crack, ∆ pin hole, X crack

Referring to Table 3, the rechargeable lithium battery cells using a thick-film electrodes having a loading level of 12 mg/cm² or more by using a binder obtained by mixing carboxymethyl cellulose having a polymerization degree of greater than or equal to about 1500, polyvinyl alcohol, and a styrene-butadiene rubber according to Examples 1 to 4 showed excellent adherence to a current collector and a minimum crack on the surface compared with the rechargeable lithium battery cells according to Comparative Examples 1 to 5. Accordingly, the negative electrodes may realize a rechargeable lithium battery cell having excellent cycle-life characteristics.

Evaluation 3: Cycle-life Characteristics of Rechargeable Lithium Battery Cell

The rechargeable lithium battery cells according to Example 1 and Comparative Example 1 were charged at 4.35 V and 0.5 C and then, discharged at 1 C and a cut-off of 3.0 V, and cycle-life characteristics thereof were evaluated after 100 cycles repeating the charge and discharge. The results are provided in FIG. 2.

Figure 2:
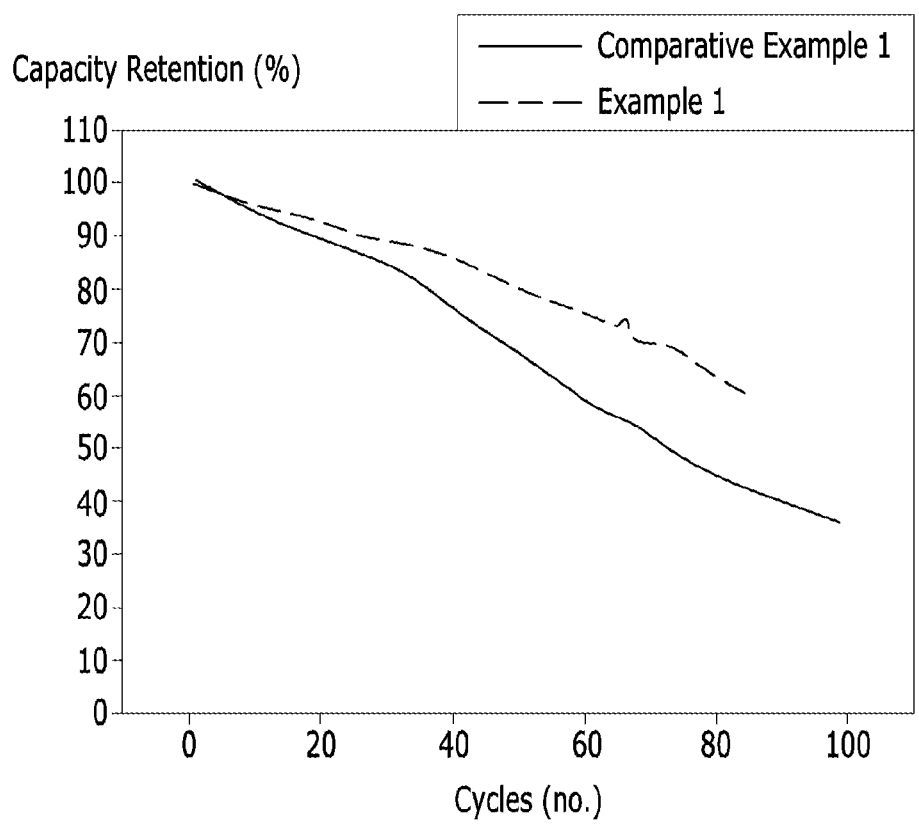
FIG. 2 is a graph showing cycle-life characteristics showing the rechargeable lithium battery cells according to Example 1 and Comparative Example 1.

FIG. 2 is a graph showing cycle-life characteristics of the rechargeable lithium battery cells according to Example 1 and Comparative Example 1.

Referring to FIG. 2, the rechargeable lithium battery cell using a thick-film electrode having a loading level of greater than or equal to 12 mg/cm² and including a binder obtained by mixing carboxymethyl cellulose having a polymerization degree of greater than or equal to about 1500, polyvinyl alcohol, and a styrene-butadiene rubber according to Example 1 showed excellent cycle-life characteristics compared with the rechargeable lithium battery cell according to Comparative Example 1.

In contrast, the negative electrodes according to Comparative Examples 6 and 7 had a smaller loading level (mg/cm²) than that of the negative electrodes according to Examples 1 to 4 and barely attain high-capacity.

While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims. In the present disclosure, the terms "Example," "Reference Example" and "Comparative Example" are used to identify a particular example or experimentation and should not be interpreted as admission of prior art.

What is claimed is:

1. A negative electrode for a rechargeable lithium battery, comprising:
a negative active material and a binder,
wherein the binder comprises carboxymethyl cellulose, polyvinyl alcohol, and a styrene-butadiene rubber,
the carboxymethyl cellulose comprises a repeating unit represented by Chemical Formula 1 and a repeating unit represented by Chemical Formula 2, a sum of a mole number ($n^1$) of a repeating unit represented by Chemical Formula 1 and a mole number ($n^2$) of a repeating unit represented by Chemical Formula 2 is greater than or equal to about 1500, and
a loading level, a weight per a unit area of a cross-section of the negative electrode, is greater than or equal to about 12 mg/cm²:

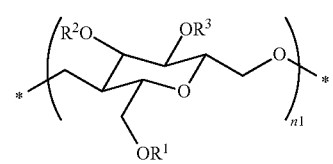

Chemical Formula 1 wherein,
$R^1$ to $R^3$ are each independently a hydrogen atom, or $-(CH_2OCH_2)_{p1}-COOX^1$, wherein at least one of $R^1$ to $R^3$ is $-(CH_2OCH_2)_{p1}-COOX^1$, wherein $p^1$ is an integer ranging from 1 to 5, and $X^1$ is an alkali metal, and
$n^1$ is an integer of greater than or equal to 600,

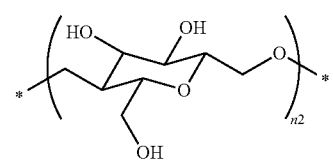

Chemical Formula 2 wherein,
$n^2$ is an integer of 0 to 2000,
wherein the polyvinyl alcohol includes a repeating unit represented by Chemical Formula 3

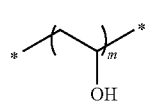

Chemical Formula 3 wherein,
m is an integer of 1500 to 3000,
wherein a glass transition temperature of the styrene-butadiene rubber greater than about −50° C. and less than 20° C.

2. The negative electrode for a rechargeable lithium battery of claim 1, wherein the sum of a mole number ($n^1$) of a repeating unit represented by Chemical Formula 1 and a mole number ($n^2$) of a repeating unit represented by Chemical Formula 2 is an integer of about 1500 to about 3000.

3. The negative electrode for a rechargeable lithium battery of claim 1, wherein the loading level of the cross-section of the negative electrode is about 12 mg/cm² to about 18 mg/cm².

4. The negative electrode for a rechargeable lithium battery of claim 1, wherein a substitution degree of the carboxymethyl cellulose is about 0.5 to about 1.5.

5. The negative electrode for a rechargeable lithium battery of claim 1, wherein the carboxymethyl cellulose is included in an amount of about 0.5 wt % to about 3 wt % based on the total amount of the negative active material and the binder.

6. The negative electrode for a rechargeable lithium battery of claim 1, wherein the polyvinyl alcohol is included in an amount of greater than 0 and less than or equal to about 0.5 wt % based on the total amount of the negative active material and the binder.

7. The negative electrode for a rechargeable lithium battery of claim 1, wherein the styrene-butadiene rubber is included in an amount of about 0.5 to about 2 wt % based on the total amount of the negative active material and the binder.

8. The negative electrode for a rechargeable lithium battery of claim 1, wherein the negative active material and the binder are included in a weight ratio of about 95:5 to about 99:1.

9. The negative electrode for a rechargeable lithium battery of claim 1, wherein a tilling density, a weight ratio per a unit volume of the negative electrode, is greater than or equal to about 1.60 g/cc.

10. A rechargeable lithium battery, comprising
the negative electrode of claim 1;
a positive electrode; and
an electrolyte solution.

11. The rechargeable lithium battery of claim 10, wherein the sum of a mole number ($n^1$) of a repeating unit represented by Chemical Formula 1 and a mole number ($n^2$) of a repeating unit represented by Chemical Formula 2 is an integer of about 1500 to about 3000.

12. The rechargeable lithium battery of claim 10, wherein the loading level of the cross-section of the negative electrode is about 12 mg/cm$^2$ to about 18 mg/cm$^2$.

13. The rechargeable lithium battery of claim 10, wherein a substitution degree of the carboxymethyl cellulose is about 0.5 to about 1.5.

14. The rechargeable lithium battery of claim 10, wherein the carboxymethyl cellulose is included in an amount of about 0.5 wt % to about 3 wt % based on the total amount of the negative active material and the binder.

15. The negative electrode for a rechargeable lithium battery of claim 10, wherein the negative active material and the binder are included in a weight ratio of about 95:5 to about 99:1.

* * * * *